United States Patent [19]

Gruner

[11] 3,995,484
[45] Dec. 7, 1976

[54] ELECTROMAGNETIC FLOWMETER CHARACTERIZED BY ZERO QUADRATURE SIGNAL

[75] Inventor: Heinz Walter Gruner, Rochester, N.Y.

[73] Assignee: Sybron Corporation, Rochester, N.Y.

[22] Filed: Aug. 14, 1975

[21] Appl. No.: 604,635

[52] U.S. Cl. .......................................... 73/194 EM
[51] Int. Cl.[2] .......................................... G01F 1/58
[58] Field of Search .............................. 73/194 EM

[56] References Cited
UNITED STATES PATENTS

| | | | |
|---|---|---|---|
| 2,808,723 | 10/1957 | Buntenbach | 73/194 EM |
| 3,550,446 | 12/1970 | Tucker et al. | 73/194 EM |
| 3,759,097 | 9/1973 | Cushing | 73/194 EM |
| 3,894,430 | 7/1975 | Rummel et al. | 73/194 EM |

*Primary Examiner*—Charles A. Ruehl
*Attorney, Agent, or Firm*—Theodore B. Roessel; J. Stephen Yeo

[57] ABSTRACT

The coils of an electromagnetic flowmeter are driven by a current waveform which is the equivalent of a composite of a sine wave and a square wave. The induced voltage is perferably sampled during steady state conditions but is at all times free of transient voltage spikes or error signals.

5 Claims, 3 Drawing Figures

ELECTROMAGNETIC FLOWMETER CHARACTERIZED BY ZERO QUADRATURE SIGNAL

BACKGROUND OF THE INVENTION

The present invention is directed to an instrument capable of measuring of fluid velocity and more particularly concerns electromagnetic flowmeters.

Electromagnetic flowmeters are well known and are used to measure the volume flow rate of a wide range of fluids. The fluid is usually a liquid, and may be abrasive or non-abrasive, chemically corrosive or passive; the only limitation is that the liquid has some conductivity. Electromagnetic flowmeters offer major advantages over other flow indicating devices, being non-obstructive to the moving fluid and having no moving parts.

The principle of electromagnetic flowmeter operation is based upon Faraday's law: if a conductor moves through a magnetic field, an electrical potential is developed across the conductor in a direction orthogonal to both the conductor and the magnetic field. In the case of an electromagnetic flowmeter, the conductor is the fluid moving through a conduit or a pipe with a magnetic field of more or less parallel flux lines transverse to the fluid flow.

While the principle of electromagnetic flowmeters is relatively simple, the art is the subject of many design refinements. To sense the potential generates across the field diametrically opposed electrodes are placed in contact with the fluid. The electrodes are usually arranged on the periphery of a section of the pipe, orthogonal to both the magnetic field and the direction of the fluid flow. The pipe section may be constructed of nonconducting material whereupon the electrodes may be embedded directly within this material with a surface exposed to the liquid. If the pipe section is constructed of conductive material, the electrodes must be insulated from the pipe.

As the fluid flows through the pipe, it cuts across magnetic lines of flux and develops a potential which can be measured across the electrodes. This electrical potential is a function of both the magnetic strength and the velocity of the fluid. If the magnetic field is held constant, the electrical potential will ideally be a function of the fluid velocity alone. Conductivity of the fluid is not a factor providing it exceeds a minimal value.

The voltage developed across the electrodes is usually amplified by an amplifier known in the art as a "transmitter" or "secondary device". Magnetic flux is preferably supplied by an electromagnet. The flow through the pipe is not perfect so eddy currents may be present at the boundary between the fluid and the pipe. The effect of these currents in the presence of a steady magnetic field is to gradually polarize the electrodes because of electrolytic action so as to provide an erroneous electrical bias. Attempts have been made to make the electrodes less susceptible to polarization under a steady magnetic flux, but most of such methods have proven less than satisfactory.

It, therefore, has become common in the art to alternate the magnetic flux with time so as to prevent polarization of the electrodes. Usually the flux is varied sinusoidaly. Unfortunately, other secondary effects may occur because of a time varying magnetic field. A time varying magnetic field will induce voltages on stationary conductors placed within the field, developing voltage between the electrodes that is independent of the fluid velocity. In addition to this electrode voltage or signal, there is also multiple path AC coupling between the magnetic coils and the fluid covered electrodes. These two effects produce signals that combine to produce a signal approximately 90° out of phase with the flow signal, which is called a quadrature signal. The quadrature signal can be minimized by careful design of the sensing electrodes and focusing circuitry but cannot be eliminated completely.

Instead of using the usual sinusoidal current to change the magnetic flux direction, electromagnetic flowmeters driven by square wave currents have been developed such as described by U.S. Pat. No. 3,783,687. With a square wave the time variance is much more instantaneous than the sinusoidal wave so that the quadrature signal is substantially reduced.

One problem with square wave coil current is due to the fact that the coils are inductive and may store one or one and a half joules of energy. Upon discharge a high voltage spike of perhaps 25 kilovolts may be generated. The magnetic drive circuit must be protected from these stresses or electrical arcing may occur. Also arrangements must be made to suppress electrical noise which occurs which the coils are abruptly discharged.

Another serious drawback of a pure square wave is that the the abrupt discontinuity in magnetic flow causes transient voltage signals to appear across the electrodes. U.S. Pat. No. 3,894,430 calls for a clipped sinusoidal coil current. While not a pure square wave, it is possible for transients to be generated at the points where the current is clipped or limited. To avoid the effect of these transients, sample and hold techniques are used to sample the voltages between the electrodes during the interval when the current is constant. The problem is that the transients may not be completely damped at the time of the sample and erroneous voltages can still be generated.

It is desirable to more nearly approximate continuous monitoring. Accordingly, sample rate time must be quite rapid, preventing the luxury of allowing any transients to decay. It is also highly desirable to provide an electromagnetic flowmeter that varies magnetic flux so as to prevent polarization of electrodes and quadrature signals as well as to eliminate transient voltages being induced upon the electrodes thereby allowing a fast sample rate.

Accordingly, an object of the invention is to provide a flowmeter having a minimized quadrature signal while avoiding generation of transients.

SUMMARY OF THE INVENTION

A flowmeter has field means for producing an alternating magnetic field across a pipe in a direction transverse to the flow of liquid in the pipe. Movement of the liquid flowing through the pipe causes voltages to be induced in the liquid which are picked up by electrodes. The waveform of the magnetic field is characterized by having segments of constant magnitudes. These flat wave segments are interconnected by monotonic curvilinear segments.

BRIEF DESCRIPTION OF THE DRAWINGS

Other objects and advantages of the invention will become apparent upon reading the following detail description and upon reference to the drawings, in which.

DESCRIPTION OF THE PREFERRED EMBODIMENT

Figure 1:
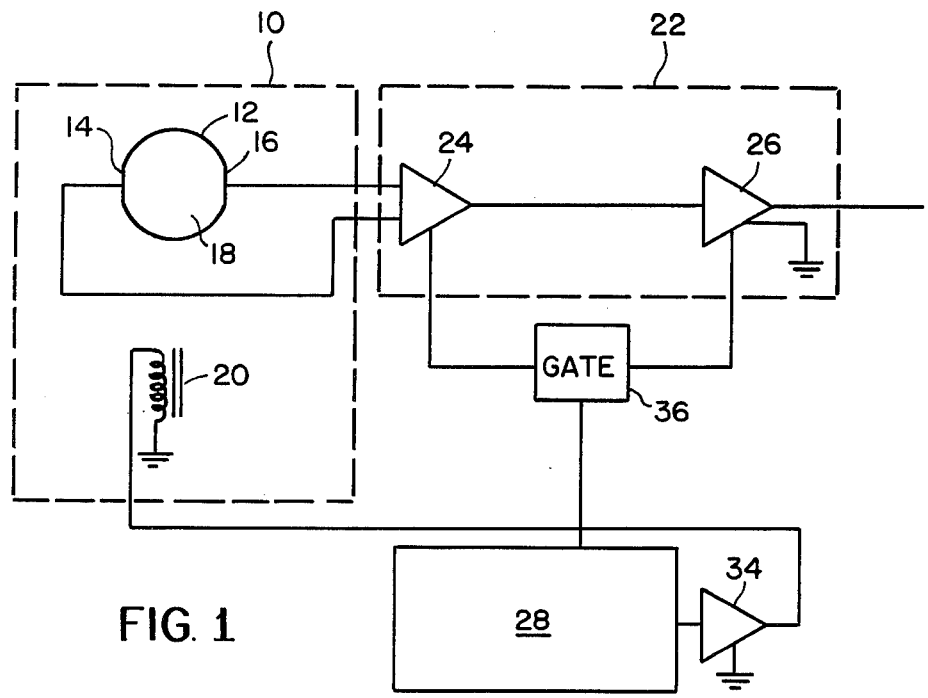
FIG. 1 is a block diagram of an electromagnetic flowmeter and circuitry suitable for practicing the invention.

FIG. 1 is a diagram of an electromagetic flowmeter 10 and its associated circuitry, which includes the present invention. A conduit or pipe 12 is shown as having a circular cross-section but is not so limited. Diagonally opposed electrodes 14, 16 are mounted on the wall of pipe 12 so as to maintain electrical contact with fluid 18 or liquid flowing through the pipe. Magnetic field coils 20 are arranged so as to provide a magnetic field orthogonal to both said fluid flow and to the diagonal of said electrodes 14, 16.

As a feature of the invention, the output of the electrodes 14 and 16 are connected to the input of a secondary 22 (art term for amplifier circuitry) including a sample and hold circuit 24 having an output connected to a DC amplifier 26. In the preferred embodiment a waveform synthesizer 28 generates an output signal having a waveform 30.

Figure 2:
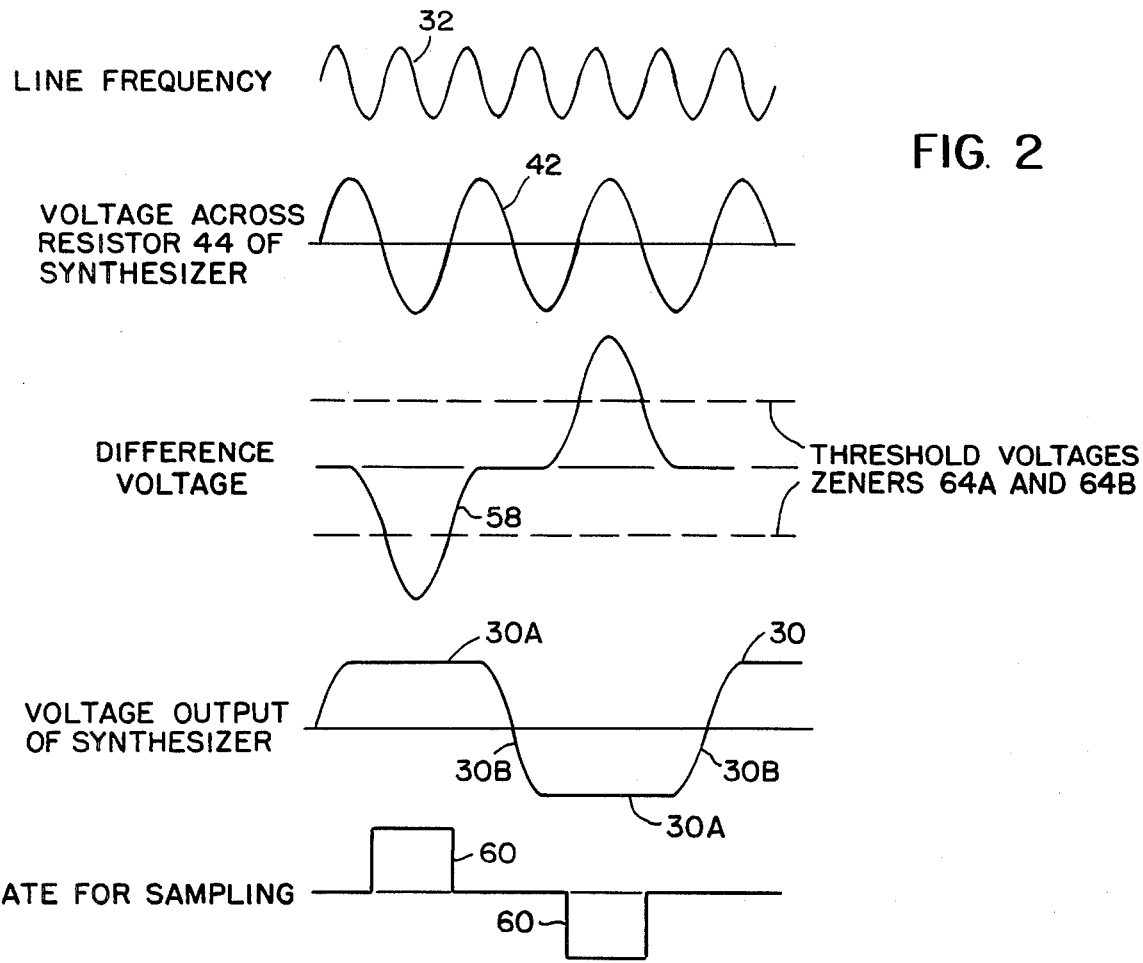
FIG. 2 illustrates several wave forms present within the circuit of FIG. 1.

As depicted by FIG. 2, waveform 30 is an alternating current or voltage having DC levels or flat segments 30A of equal magnitude but which are of opposite direction or polarity continuously connected by interposed monotonic increasing or decreasing 30B sinusoidal pulses of one-half cycle duration. Thus, the peaks of the sinusoidal pulses, where the slope is zero, mark the beginning and end of the flat segments of the wave so as to avoid the generation of higher frequencies.

The frequency of waveform 30 is preferably less than the line frequency 32 to prevent sixty cycle pickup.

The output of the waveform synthesizer 28 is directed through, and amplified, a current amplifier 34 to drive the field coils at a peak level of appropriate 3 to 5 amperes. The resulting magnetic flux has an alternating waveform substantially the same shape as the current waveform 30. A voltage is generated across electrodes 14, 16 and also has a waveform similar to wave 30.

Returning now to FIG. 1, the waveform synthesizer 28 includes means to generate a gating signal for a portion of the time when wave 30 is flat. This gating signal is applied to a gate circuit 36 controlling sample and hold circuit 24 so that the voltage across the electrodes is sampled only during the period that the magnetic flux is at a constant magnitude. Second order effects, such as AC coupling between the coils 20 and the electrodes 14, 16, are time dependent and are generated by a changing magnetic flux and are absent during the period of constant flux. The amplitude of the sampled voltage across the electrodes is, therefore, a function of the fluid velocity through the pipe.

The DC sample signal from sample and hold circuit 24 is amplified by DC amplifier 26, which may also be controlled by the gate 34. The amplified sample signal is proportional to the sampled peak signal across the electrodes and represents fluid velocity.

It is seen that the flux periodically reverses direction thereby avoiding polarization of electrodes. The continuous leading and trailing edge of the magnetic wave eliminates unwanted transient voltage across the electrodes. The result is an output signal having substantially no AC drift, thereby simplifying and improving amplifier design and increasing the reliability of fluid flow measurements. Also, since the current amplitude is controlled by waveform synthesizer 28 the flow signal will be independent of line voltage fluctuation and no line compensation is required in the secondary circuit.

Figure 3:
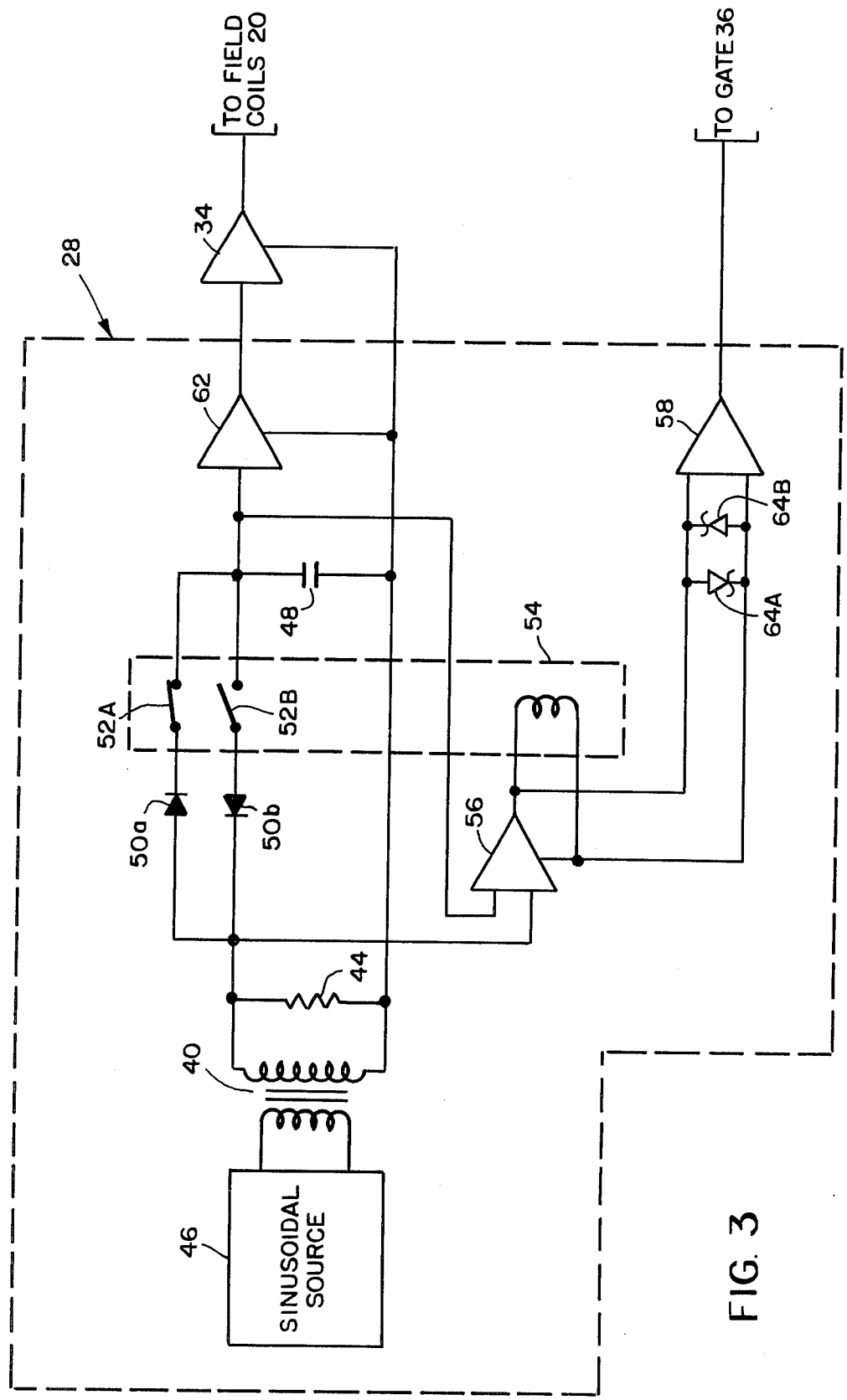
FIG. 3 is a detail schematic of a circuit of FIG. 1.

The waveform generator 28 may be constructed using known digital circuits, however because of the low frequencies involved, the preferred embodiment is the electromechanical arrangement depicted in FIG. 3.

Transformer 50 couples a sinusoidal voltage 42 across resistor 44 from source 46. This voltage is used to charge capacitor 48. Interposed between capacitor 48 and resistor 44 is a pair of rectifying diodes 50a and 50b arranged parallel and in opposite polarity. In series with each of the two diodes 50a and 50b is one of two switches 52A and 52B. The two switches are operated by a stepping relay 54 so that one switch is closed when the other switch is open. The stepping relay 54 alternates the switch positions in response to the output of a differential amplifier 56. The inputs of the differential amplifier are the voltage 42 across resistor 44 and the voltage 30 across capacitor 48 whereas the output is the difference represented by curve 58 of FIG. 2.

The operation of the waveform generator will now be explained. Assume the sinusoidal voltage 42 across resistor 44 has just passed through zero and is raising to a positive peak. The switches are arranged so the switch 52A is closed allowing conduction through diode 50A. Capacitor 48 is thus charged to a potential approximately equal to the peak voltage across resistor 44. When the sinusoidal voltage 42 reverses its slope the voltage across capacitor 48 is prevented from discharge by diode 50A.

The voltages across capacitor 48 and resistor 44 are permanently connected to the inputs of differential amplifier 56. When the difference voltage 58 reaches zero, the differential amplifier 56 releases the relay 54 which alternates the switch positions so that switch 52A opens and switch 52B closes. The voltage 30 across the capacitor 48 then follows the negative slope of the voltage across resistor 44 until it reaches the negative peak voltage. This voltage is held until the switch positions are again alternated. Thus, the voltage 30 across capacitor 48 has a voltage waveform similar to that shown in FIG. 2 which is converted to a current waveform of the same shape by amplifier 44. A high impedance buffer amplifier 62 is provided to prevent discharging the capacitor.

The gating signal 60 is provided by comparator 58 to gate the secondary amplifier 24 and 26 of FIG. 1. The comparator 58 generates as a output gating signal 60 when the voltage from differential amplifier 56 exceeds a threshold determined by zener diodes 64A and 64B. The sampled voltage has a waveform similar to the gating voltage 60.

The practice of this invention will yield a flow signal substantially free of noise because of the avoidance of transients and line interference, thus allowing the use of amplifiers (secondary) having higher gains than now commonly used in electromagnetic flowmeter. Accordingly, less voltage is required at the electrodes for a given output, allowing the use of less coil current.

As already described, the voltage potential across the electrodes is sampled periodically. Accordingly, there exists periods of times when the electrodes are not used for measurement purposes. These unused periods can be used to clean the electrodes from deposits by means of ultrasonic cleaners or the like.

The flowmeter disclosed gives all the advantages of a DC field flowmeter while retaining all advantages of an AC field flowmeter. The result is a flowmeter having improved zero stability, good electrode fouling immunity, and reduced secondary cost.

Thus, it is apparent that there has been provided, in accordance with the invention, a flowmeter that fully satisfies the objects, aims, and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

I claim:
1. An electromagnetic flowmeter comprising:
a pipe;
a pair of measuring electrodes provided on said pipe;
an electromagnetic coil responsive to a current for establishing a field which is intersected by a fluid passing through the pipe to produce a signal voltage across the electrodes; and
current means for supplying said current; said current having a periodic waveform, each period of which is characterized by
 1. a first and a second DC level, and
 2. continuous transitions between said DC levels, said transitions being monotonic half cycles of a sine wave, said half cycles interposed between said DC levels beginning and ending with zero slope

2. An electromagnetic flowmeter as set forth in claim 1 wherein said periodic waveform has a lower frequency than line frequency.

3. The flowmeter of claim 1 wherein said DC levels have a longer duration than one of said transitions.

4. The flowmeter of claim 3 wherein said current means is comprised of:
a sinusoidal source for generating sine waves having a maximum and a minimum peak values;
holding means for alternating holding the maximum and minimum values of the generated sine wave between two of said peak values for one cycle of said sine wave, thereby providing an output of alternating DC levels of one cycle duration separated by one-half cycle of said sine wave.

5. An electromagnetic flowmeter as claimed in claim 1 which further includes an amplifier connected to said electrodes and gating means for turning the amplifier on for a portion of the time during which said DC levels are present so that said amplifier has an output signal, the amplitude of which is a function of flow rate.

* * * * *